R. L. NELSON

COFFEE-POTS.

No. 7,716. Reissued May 29, 1877.

WITNESSES:

W. W. Hollingsworth

Solon C. Kemon

INVENTOR.

Richard L. Nelson

BY

Munn & Co.

ATTORNEYS.

N. PETERS, PHOTO-LITHOGRAPHER, WASHINGTON, D. C.

UNITED STATES PATENT OFFICE.

RICHARD L. NELSON, OF ORANGE COURT-HOUSE, VIRGINIA.

IMPROVEMENT IN COFFEE-POTS.

Specification forming part of Letters Patent No. 188,025, dated March 6, 1877; reissue No. 7,716, dated May 29, 1877; application filed May 15, 1877.

*To all whom it may concern:*

Be it known that I, RICHARD L. NELSON, of Orange Court-House, in the county of Orange and State of Virginia, have invented a new and useful Improvement in Coffee-Pots and Processes of Making Coffee; and I do hereby declare that the following is a full, clear, and exact description of the same.

The invention relates, first, to an improved process of making coffee beverage; and, second, to an improved construction of coffee-pot for carrying out the process.

The latter consists in allowing water to drip through a small aperture in the bottom of a water reservoir or holder upon the ground coffee placed in a receptacle beneath the reservoir.

Figure 1:
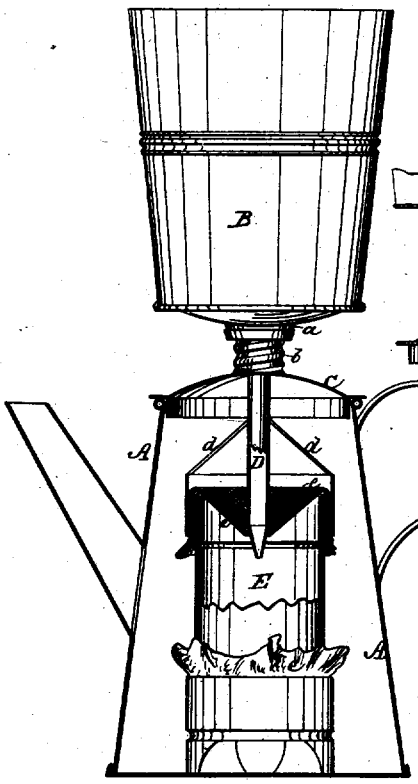
Figure 2:
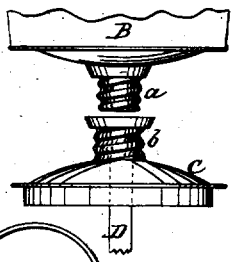

The improved coffee-pot is shown in the accompanying drawing, in which Figure 1 is a partly-sectional elevation of the same, and Fig. 2 a detail view.

A is the coffee-pot-proper; B, a water-reservoir attached to the cover C, and D a tube having its lower end contracted so as to leave a very small orifice. E is a receptacle or holder for the ground coffee. The details of the construction of these parts will be more fully described hereinafter.

In carrying out the process, ground coffee is placed in holder E, and boiling-hot water poured into reservoir B. The water at once begins to drip slowly, or fall in drops, into the coffee-holder, its more rapid passage being hindered by the contracted discharge-orifice. This dropping or dripping of the water is indispensable to the desired result.

In the first part of the process, each drop, as it falls, strikes upon the bed of ground coffee, and at once spreads over the same, and is gradually absorbed or percolates slowly through the mass. Thus the successive drops come in contact with the whole quantity of coffee.

In the second or final stage of the process, after the drip-water has accumulated in the holder E and in the space surrounding it, so as to stand above the level of the ground coffee in said holder, the operation is changed only in this, that the drops of water do not fall directly upon the coffee, although they will none the less be disseminated, and then percolate through the coffee and continue and perfect the work of extraction. An advantage arises from the delivery of the drip in the transverse center of the holder E, since the operation of equal dissemination and subsequent percolation through the whole mass of ground coffee is thereby facilitated.

In the class of coffee-pots in which the water passes with comparative rapidity from the reservoir through the coffee-holder into the pot there is a different operation, and the result is, that the principle of the coffee is not extracted in so perfect a manner, in so short a time, nor with so little care and labor.

The details of construction of the various parts of the coffee-pot are as follows: The water-reservoir B is provided at the bottom with a screw-threaded tube or collar, *a*. The cover C of the coffee-pot proper has a corresponding screw-threaded socket, *b*, which is permanently attached to the upper side thereof. The screw-joint thus formed (Fig. 2) between the holder B and cover C enables the former to be quickly attached to, or detached from, the latter, as occasion requires. The cover C has a permanently-attached pendent tube, D, which is contracted at its lower end to reduce the size of the opening therein, to retard the escape of water into the coffee-holder. The cover is also rigidly connected, by means of bars or braces *d*, with the annular cap of the coffee-holder. The said cap secures a cloth strainer, *e*, in place on the body of holder E, and the end of tube D enters an eyeleted opening in the center of the strainer. The tube is made of such length as to extend below the top of the holder, and hence depresses the strainer, and imparts to it a funnel shape, as shown.

The chief function of the tube D is to cause the water placed in the cup or receptacle B to drip into the coffee-holder E; but it also serves to retain the latter in place within the coffee-pot.

A wire-gauze strainer may be employed in place of the cloth strainer, and the tube D may be deprived of its taper point, and made to rest on the surface of the straining-cloth; but the contracted orifice would, of course, be retained. The use of the eyelet in the cloth is to prevent wear of the same.

The general operation is as follows: The requisite quantity of ground coffee having been placed in the holder E, the strainer *e* is laid over the top of the same, and the ring-cap forced down to secure it. The end of the tube simultaneously enters the eyeleted opening in the strainer, and stretches it tightly. Thus the cover C, tube D, and holder E are connected, and form, practically, one device. The holder E is now placed in the coffee-pot A, and the cover C adjusted in place thereon, as shown. The water-reservoir B may be previously, or subsequently, attached to the cover C by the screw-joint before described. A quantity of water—sufficient to make the desired quantity of liquid or drinking coffee—is then poured into the reservoir B, and it at once begins to drip slowly through the tube D, and percolates slowly through the grounds in the holder E. The coffee-pot may be at once set on the stove or other heating medium, and to heat the liquid as it accumulates in the pot A, so that it will immediately begin to boil, and by the time the water has all escaped from the receptacle B (about seven minutes) the beverage will be ready for use. This result is, therefore, attained in a much shorter time than when the water is placed in the pot at the outset, and the quality of the beverage is also improved correspondingly. The proper size of the orifice from which the drip escapes is one-sixteenth ($\frac{1}{16}$) of an inch in diameter for a quart coffee-pot.

The drip attachment may be furnished complete for coffee-pots already manufactured or in use by ascertaining their depth and diameter at the top, and providing a cover of corresponding size.

What I claim is—

1. The improved process of making coffee beverage, consisting in causing the water to pass through a small orifice, and thereby drip or fall in drops into a receptacle containing the ground coffee, so that it becomes disseminated and percolates slowly through the entire mass, as and for the purpose hereinbefore set forth.

2. The combination of a water-reservoir having a central drip-orifice, D, a coffee-pot, and coffee-holder, all arranged as shown and described, to operate as specified.

RICHARD L. NELSON.

Witnesses:
AMOS W. HART,
JAMES H. GRIDLEY.